United States Patent …

(12) United States Patent
Neal et al.

(10) Patent No.: US 10,016,856 B2
(45) Date of Patent: *Jul. 10, 2018

(54) METHOD OF REBUILDING AN EGR COOLER

(71) Applicants: Eugene Neal, Phoenix, AZ (US); Kennieth Neal, Mesa, AZ (US)

(72) Inventors: Eugene Neal, Phoenix, AZ (US); Kennieth Neal, Mesa, AZ (US)

( * ) Notice: Subject to any disclaimer, the term of this patent is extended or adjusted under 35 U.S.C. 154(b) by 472 days.

This patent is subject to a terminal disclaimer.

(21) Appl. No.: 14/462,171

(22) Filed: Aug. 18, 2014

(65) Prior Publication Data

US 2014/0352671 A1    Dec. 4, 2014

Related U.S. Application Data

(63) Continuation-in-part of application No. 13/328,736, filed on Dec. 16, 2011, now Pat. No. 8,839,518.

(60) Provisional application No. 61/459,641, filed on Dec. 16, 2010.

(51) Int. Cl.
*B23P 6/00* (2006.01)
*B23P 15/26* (2006.01)
*F02M 26/32* (2016.01)

(52) U.S. Cl.
CPC ............... *B23P 15/26* (2013.01); *B23P 6/00* (2013.01); *F02M 26/32* (2016.02); *Y10T 29/49352* (2015.01)

(58) Field of Classification Search
CPC ........ F02M 25/0737; B23P 6/00; B23P 15/26; Y02T 10/121; Y10T 29/49352
See application file for complete search history.

(56) References Cited

U.S. PATENT DOCUMENTS 8,839,518 B1 *    9/2014   Neal et al. ................. 29/890.04

* cited by examiner

*Primary Examiner* — Richard Chang
(74) *Attorney, Agent, or Firm* — Hartman Titus PLC; John D. Titus

(57) ABSTRACT

A method of rebuilding a salvaged EGR coolers is disclosed in which the existing heat exchanger elements are removed from the salvaged stock EGR cooler housing and replaced with a heat exchanger element made from a pair of heat exchanger tube sub-assemblies. Each of the heat exchanger tube sub-assemblies includes an end plate with a selected number of attached tubes and a selected number of bores, which are adapted to receive the ends of the tubes attached to the other tube sub-assembly. The tube sub-assemblies are mated together with the free ends of the tubes received into the bores of the opposite end plate. Exhaust fittings are then welded to the ends of the housing.

12 Claims, 7 Drawing Sheets

METHOD OF REBUILDING AN EGR COOLER

CROSS-REFERENCE TO RELATED APPLICATION

This application claims priority based on co-pending U.S. patent application Ser. No. 13/328,736 filed on Dec. 16, 2011 the contents of which are hereby incorporated by reference.

TECHNICAL FIELD

This description relates generally to automotive emissions devices, and more specifically to an improvement in exhaust gas re-circulation ("EGR") coolers and also relates more specifically to a method of rebuilding salvaged EGR coolers for subsequent use as replacement units having improved efficiency and durability over stock coolers.

BACKGROUND

Exhaust Gas Recirculation has been utilized for a number of years in both compression ignition and spark ignition engines as a means of reducing exhaust emissions. As is well known, nitrogen oxides, primarily nitric oxide (NO) and nitrogen dioxide ($NO_2$) (collectively referred to as "NOx") are undesirable byproducts of combustion, which are formed when the nitrogen in air is exposed to high temperatures, such as in an internal combustion engine. As is also well-known, exhaust gas recirculation is an effective means of reducing the combustion temperature of an internal combustion engine. Exhaust gas re-circulation involves introducing a metered amount of exhaust gas into the cylinder during the intake stroke along with the fresh charge of air/fuel mixture. The exhaust gas displaces a portion of the air/fuel mixture entering the cylinder which reduces the combustion temperature thereby inhibiting the formation of NOx.

An EGR cooler is a component in the exhaust gas recirculation system that cools the exhaust gas before it is re-introduced into the combustion cylinder. Cooling the exhaust gas enables a cooler, denser charge of re-circulated exhaust gas to be introduced into the combustion cylinder, thereby further reducing combustion temperatures and NOx emissions.

The EGR cooler itself is a heat exchanger that utilizes engine coolant to remove heat from the exhaust gas flowing through it. The heat exchanger design keeps the coolant and exhaust gas from mixing, but allows for heat to flow from the exhaust gas to the engine coolant. Typically, the EGR cooler is a tube-and-shell heat exchanger in which a shell structure surrounds a plurality of tubes that run through the shell. Exhaust gas is passed through the tubes while engine coolant is circulated through the shell. Heat from the exhaust gas is transferred to the coolant in contact with the tubes. The coolant then passes through the water jacket of the engine and finally to the radiator where it is cooled by air passing through the radiator fins. In summary, the EGR cooler is a heat exchanger through which engine coolant can circulate to extract heat from a portion of the spent exhaust gases which are cooled and redirected back to the engine intake manifold such to reduce the creation of NOx vehicle emissions.

Original Equipment Manufacturer ("OEM") EGR coolers can fail for various reasons. Their failure may range from degradation of performance with concomitant increase in NOx emissions to a catastrophic failure that disables the vehicle. A common catastrophic failure is caused by a plugged oil cooler depriving the EGR cooler of coolant. If coolant flow to the EGR cooler is reduced, the EGR cooler can be subjected to excessively high exhaust gas temperatures. The resulting extreme temperature rise in the EGR cooling unit can rupture or crack the internal pathways of the EGR cooler. Ruptures can occur due to reduced coolant flow causing temperatures above the boiling point of the coolant. The coolant may "flash boil" in the EGR cooler, especially if circulation is reduced allowing the coolant to remain on the hot spot long enough to boil. Boiling can cause a rupture within the ECR cooler when the liquid coolant is suddenly turned into an expanding gas. This rupturing can lead to the mixing of the exhaust and engine coolant through the in ruptures or cracks in the EGR cooler. This type of catastrophic malfunction can cascade into the other engine systems, damaging the engine and its associated components.

Another failure causing reduced effectiveness of the EGR cooler, and degraded EGR system performance can arise due to the internal configuration of the conventional EGR cooler. In conventional OEM EGR cooler designs only a few tubes (typically oval in shape) are incorporated in the construction. The tubes may contain baffling, or thin heat exchange fins on the interior of the tubes to increase the surface area available for heat exchange. This finned structure, however, can lead to another failure mechanism through clogging of the exhaust gas passageways. The conventional tube and fin heat exchange EGR cooler designs can become clogged over time due to a buildup of particulates that can be found in the exhaust and other factors, resulting in substantially reduced heat transfer capability and higher exhaust gas temperatures in the intake manifold. The higher temperature re-circulated exhaust gas leads to increased NOx production due to higher combustion temperatures. Accordingly, there exists a need for an improved EGR cooler that is less prone to catastrophic failure and performance degradation, including clogging in the exhaust passage ways, rupturing when coolant flow is reduced, and other failure, or performance reducing mechanisms. It is also desirable to provide a method of rebuilding salvaged conventional EGR coolers to solve the abovementioned and other problems.

SUMMARY

The present invention provides an EGR cooler for diesel and other engines. In an illustrative embodiment, an EGR cooler incorporating features of the present invention has an exterior housing which may be of various conventional configurations to facilitate convenient replacement of an existing failed EGR cooler such as OEM EGR cooler without requiring engine modifications. The configuration will depend upon the engine in which the EGR cooler is to be installed. The EGR cooler of the present invention may also be provided as an OEM unit, replacing conventional cooler designs. The cooler housing contains a plurality of stainless steel tubes which extend axially within the housing and communicate with exhaust inlet and outlet fittings at opposite ends of the housing so the engine exhaust flows through the tubes. Coolant is directed to the housing interior at an inlet in the housing sidewall and is discharged back to the cooling system at an outlet adjacent the opposite end of the housing. The exhaust gas flows through the stainless steel tubes in heat exchange relationship with the coolant, which circulates around the tubes to extract heat from the gas.

The large cross-sectional areas of the gas tubes within the interior of the housing allows the gas and coolant to have substantial contact surfaces for enhancement of heat exchange with minimal flow restriction. The design eliminates obstructions to flow through, reducing dwell time in the EGR cooler, minimizing the possibility of flash boiling of the coolant within the EGR cooler while reducing potential for buildup of soot.

The method of refurbishing or rebuilding conventional or salvaged OEM EGR coolers comprises initially removing the exhaust fittings at the opposite ends of the tubular housing providing access for removal of the existing fin and tube interior heat exchanger components. The housing is then cleaned after which replacement heat exchange sub-assemblies are inserted. Each sub-assembly comprises a plurality of tubes pressed into an end plate. Each end plate also has bores to receive the ends of the tubes of another preferably identical sub-assembly. The sub-assemblies are assembled together to form a complete tube assembly, after which the tubes are welded to the end plates and any tube ends projecting beyond the end plates are cut off. The tube ends are ground and finished and the tube assembly welded into the salvaged housing. The removed exhaust inlet and outlet fittings are welded to the opposite ends of the housing. The coolant inlet and outlet fittings generally do not have to be removed unless they are damaged and require replacement. The rebuilt EGR cooler can be installed to replace a removed OEM unit without modification to the engine as the unit size and fitting locations correspond to those of the removed unit.

DESCRIPTION OF THE DRAWINGS

The present invention will be better understood from a reading of the following detailed description, taken in conjunction with the accompanying drawing figures in which like references designate like elements and, in which.

DETAILED DESCRIPTION

Figure 1:
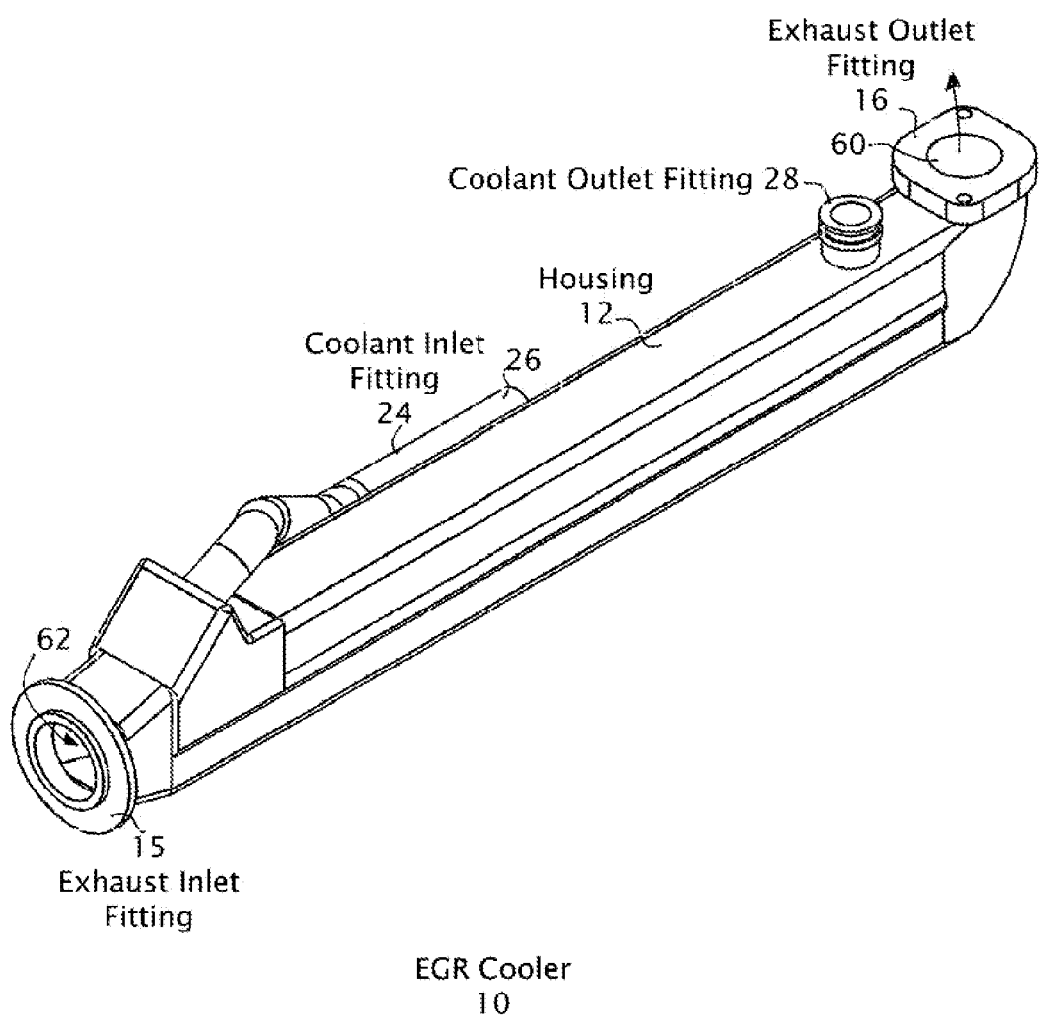
FIG. 1 is a perspective view taken from one side of an EGR cooler according to the present invention.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

The examples below describe a unique construction of an EGR cooler that may be fabricated as a new part, and a method of fabricating the unique EGR cooler utilizing stock EGR coolers that are either new or used. The used EGR coolers may be functioning or non functioning units that are suitable for re-fabricating. Although the present examples are described and illustrated herein as being implemented in a diesel truck engine system, the system described is provided as an example and not a limitation. As those skilled in the art will appreciate, the present examples are suitable for application in a variety of different types of internal combustion engine systems, including gasoline engines, diesel engines and the like.

Figure 5:
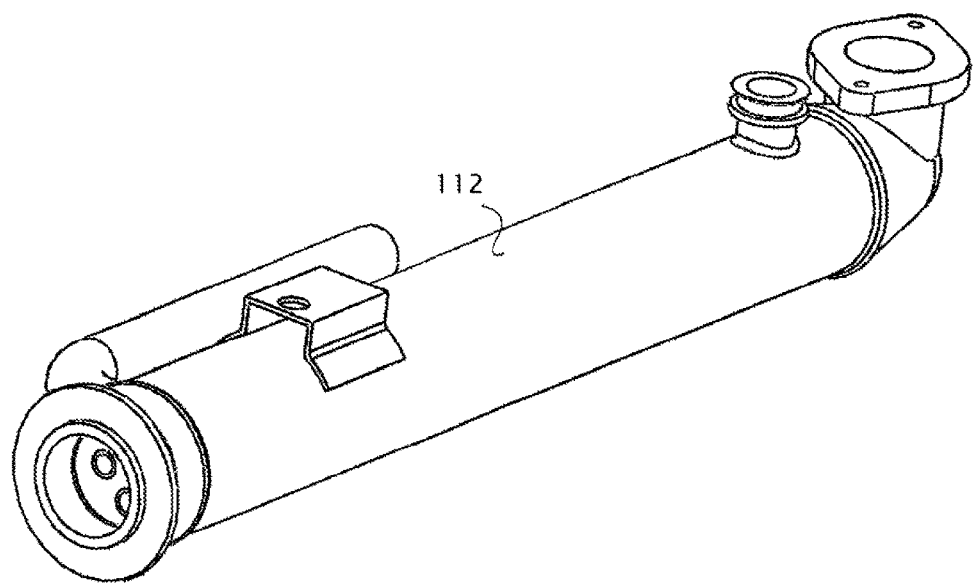
FIGS. 5 and 6 are perspective views of other embodiments of the cooler according to the present invention.
Figure 6:
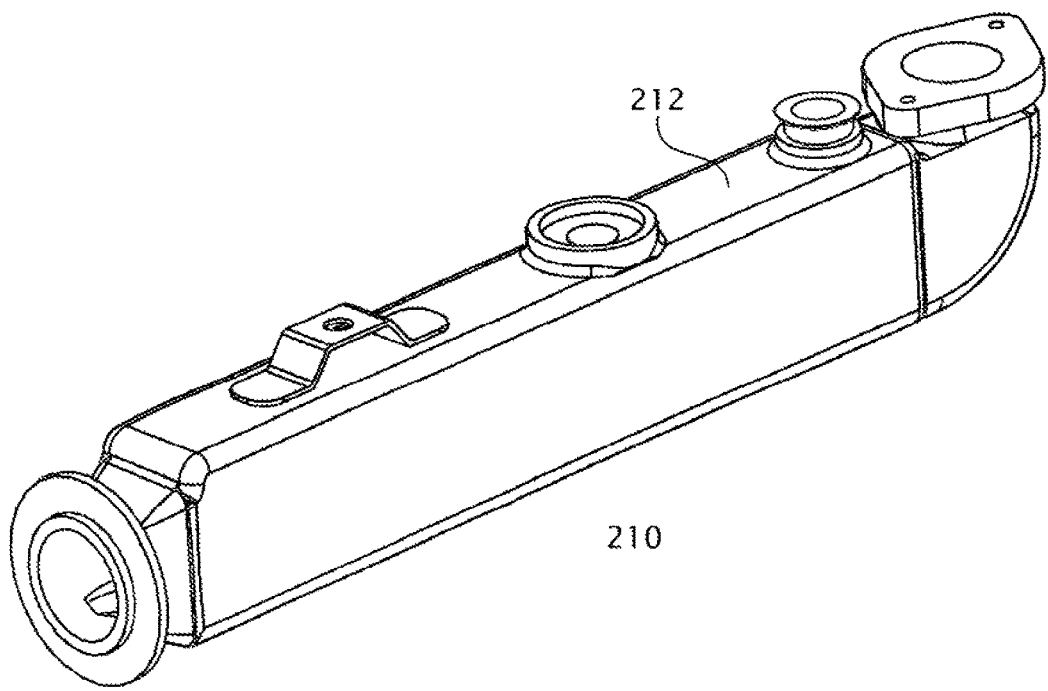

FIGS. 1-4 show an example of the specially constructed EGR cooler. FIGS. 5 and 6 show two alternative examples of specially constructed EGR coolers. Any of the examples may be fabricated as new units, or fabricated utilizing used conventional parts that are suitable for reconditioning, or remanufacturing utilizing unique parts in order to form a new specially constructed EGR cooler. FIG. 1 is a perspective view taken from one side of an EGR cooler according to the present invention. The EGR cooler according to the present invention is generally designated by the numeral 10 and has a housing 12 shown as being tubular. Housing 12 which defines a heat exchanger shell or coolant chamber (74 of FIG. 2) extending the length of the housing interior. The housing is made from suitable materials, fabricated according to methods known to those skilled in the art. The housing 12 has a flanged exhaust inlet fitting 15 on one end of the housing and an upwardly extending flanged exhaust outlet fitting 16 on the other end of the housing. The fittings 15 and 16 are sized and located to connect to existing fittings in the engine exhaust system. In alternative examples, fittings differing from those present in a stock vehicle may be utilized such as those which might be utilized in a custom exhaust system. As constructed, a portion of the exhaust is directed through the EGR cooler housing from the inlet fitting 15 to the outlet fitting 16 where it may be directed to the intake manifold. On the interior of the specially constructed EGR cooler are a plurality of large diameter tubes (20 of FIG. 2) through which a portion of the exhaust gas from the exhaust system is circulated to the outlet fitting. In the example provided six tubes are provided. The diameter of the tubes is selected to provide sufficient exhaust gas cooling based upon the flow through the number of tubes utilized. Just inside the inlet fitting 15 and outlet fitting 16 are formed chambers to separate the exhaust gas from the coolant and to mount the plurality of tubes.

The coolant circulates within the heat exchanger chamber (74 of FIG. 2) around tubes (20 of FIG. 2) which carry the exhaust through the EGR cooler. The exhaust gas is accordingly cooled by an exchange of heat from the exhaust to the coolant. The cooled exhaust is then reintroduced to the intake manifold to be mixed with the air exchange to reduce NOx emissions.

The housing or shell its self contains coolant supplied from the engine cooling system that is introduced into the EGR cooler 10 at coolant inlet 24 located in the sidewall of the housing 12. The coolant exits the housing at coolant outlet connection 28, adjacent fitting 16. A tubular extension 26 of the inlet 24 in this particular example is adapted to connect the EGR cooler to the engine coolant system. The general shape and configuration of the housing, the location and dimensions of the exhaust gas and coolant fittings of this specially constructed EGR cooler correspond to those of a stock OEM EGR unit so replacement of an OEM unit with the EGR cooler of the present invention may be accomplished without modification to the engine.

In operation, the coolant from the engine cooling system will, under pressure of the cooling system water pump, circulate coolant from the inlet 24 through the coolant chamber (74 of FIG. 3) to the outlet 28 to be returned to the engine cooling system. Exhaust gas from the engine flows through the chamber, exiting at outlet 16 and is then directed to the engine intake manifold to be mixed with combustion air. Both the exhaust gas and coolant flow through relatively large passageways in the chamber with minimum obstruction, decreasing the dwell time and minimizing restriction issues.

Figure 2:
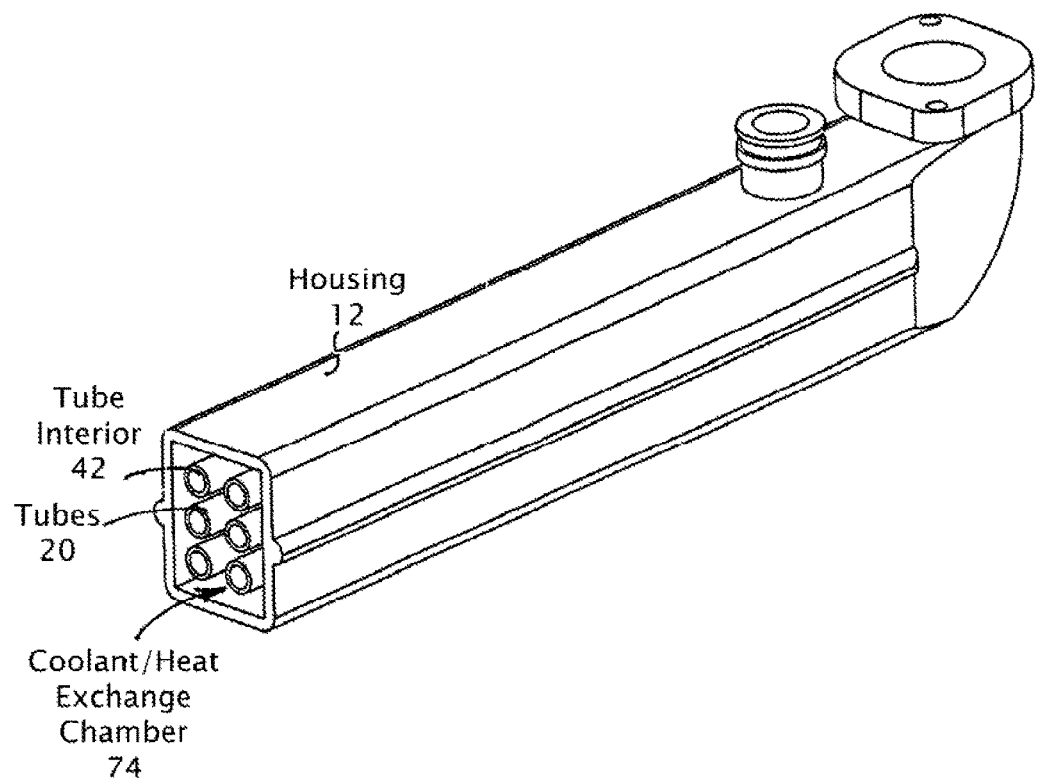
FIG. 2 is a transverse cross-section of the EGR cooler seen in FIG. 1 showing the heat exchange tube sub-assemblies.

FIG. 2 is a transverse cross-section of the EGR cooler seen in FIG. 1 showing the heat exchange tube sub-assemblies. The housing 12 contains a plurality of tubes 20 each having an internal passageway 42 through which exhaust flows. The inner passage ways are free of baffling which tends to restrict exhaust flow when contamination and debris build up on the baffling over time. Also since flow is improved with these tubes hot spots tend to be eliminated.

Figure 3:
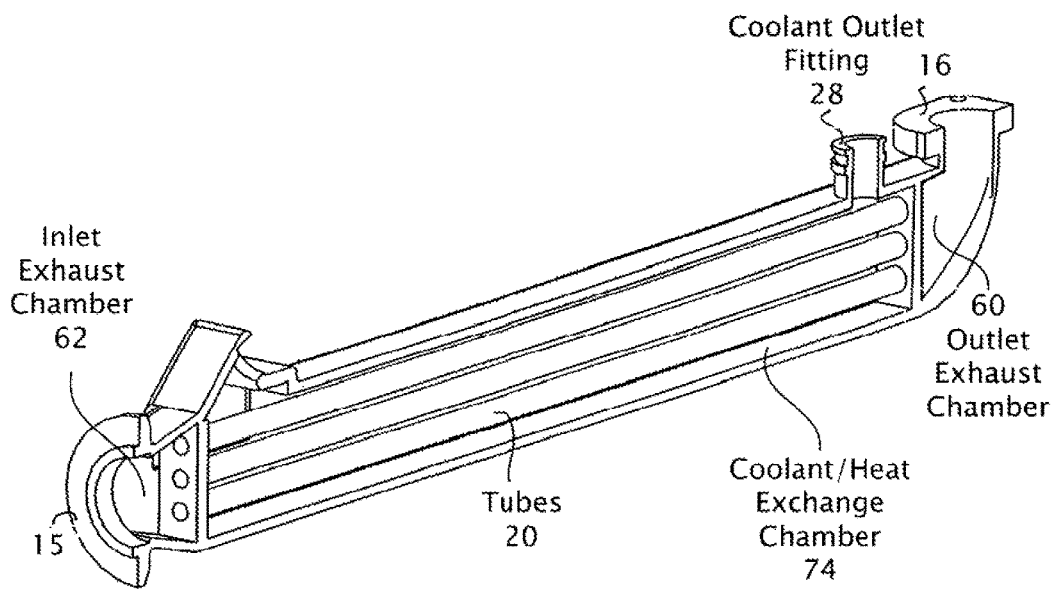
FIG. 3 is an axial cross-section of the cooler of FIGS. 1 and 2.

FIG. 3 is an axial cross-section of the cooler of FIGS. 1 and 2. At inlet 15 exhausts enters an exhaust inlet chamber 62, where it is divided into a plurality of smooth bore tubes 20. Tubes 20 are free of baffling and other heat exchange structures, yet provide sufficient heat transfer to coolant disposed in coolant chamber 74. Exhaust exits the tubes 20 and enters the exhaust outlet chamber 60 where it is routed to the engine manifold (not shown) through fitting 16. Coolant circulates through the coolant chamber 74 to cool the tubes 20 and the exhaust traveling through them. The coolant exits the chamber 74 through the coolant outlet fitting 28.

Figure 4:
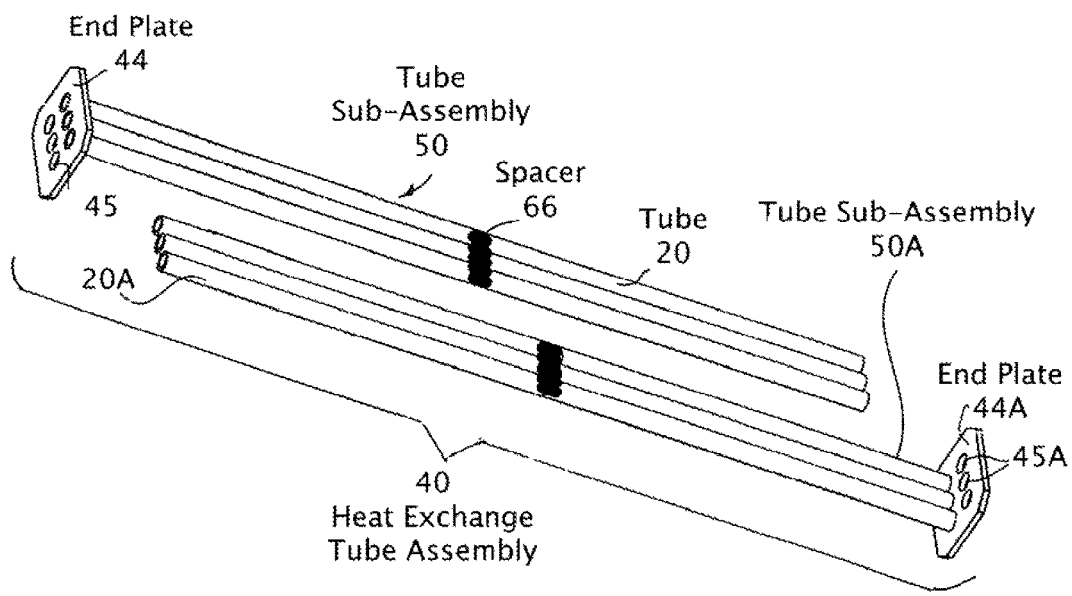
FIG. 4 is a perspective view showing the heat exchange tube subassemblies which are inserted into opposite ends of the housing and welded in place.

FIG. 4 is a perspective view showing the heat exchange tube subassemblies 50, 50A which are inserted into the housing (10 of FIG. 1) and welded in place. For reasons that will be explained more fully hereinafter, in some cases the tube subassemblies are inserted into housing 10 from opposite ends then the tubes welded, while in other instances where space permits the tube subassemblies are assembled, welded together then inserted into the housing. When assembled together in the EGR cooler housing they form a heat exchange tube assembly 40. The tube assembly 40 comprises a plurality of tubes 20 of stainless steel, or equivalent material, extending in spaced-apart relationship as defined by matching apertures disposed in an end plate 44, and 44A. Six tubes 20 are shown in this example. In the example shown, the tube assembly 40 is fabricated from two tube sub-assemblies 50, 50A each having sets of three tubes 20, 20A, although any convenient number of tubes can be incorporated in the sub assemblies. Also the sub assemblies do not have to contain the same number of tubes. One end of each of the three tubes 20 of sub-assembly 50 is rigidly assembled to end plate 44. In one embodiment, the three tubes 20 of sub-assembly 50 are welded to end plate 44, however, in a preferred embodiment one end of each of the three tubes 20 are rigidly attached to end plate 44 by an interference fit between the tubes 20 and end plate 44 (e.g. pressed into place with a hydraulic ram or similar apparatus, or shrink fitted by thermal expansion and/or contraction.) One end of sub-assembly 50A also has three tubes 20A which are assembled to end plate 44A. Each tube sub-assembly may optionally have one or more spacers 66 located at an intermediate location to maintain the tubes 44 in parallel alignment and to minimize vibration. The end plates 44, 44A are sized to seal the ends of the coolant chamber (74 of FIG. 3) when assembled, and may be of any suitable shape to achieve that function.

In one embodiment, sub-assembly 50 is inserted from one end of chamber (74 of FIG. 3) and the other sub-assembly 50A is inserted from the opposite end of chamber (74 of FIG. 3). The end plates 44, 44A each have bores 45, 45A that are in registry with and therefore to receive the free ends of the opposing tube sub-assembly. The end plates 44, 44A are welded in place and the tubes 42, 42A are also on place to complete tube assembly 40. An exhaust inlet chamber (60 of FIG. 3) and an exhaust outlet chamber (62 of FIG. 3) communicate with the respective ends of the heat exchange tubes. The inlet fitting (15 of FIG. 1) and an outlet fitting (16 of FIG. 1) are welded to the ends of the housing (12 of FIG. 1). Each fitting has a flange sized and having a bolt pattern so that it may be secured to existing mounting locations on the engine. In another embodiment, tube assembly 40 is constructed by assembly sub-assembly 50 is assembled to sub-assembly 50A with the bores 45, 45A receiving the free ends of the opposing tube sub-assembly. The tube assembly 40 is then inserted into chamber 74 and welded in place. The tubes may be welded to end plates 44, 44A before or after tube assembly 40 is welded to the housing but are preferably welded to at least one of the end plates 44, 44A after the end plates are welded so as to minimize the residual stress in the unit. Also, although the tubes 20 in the illustrative embodiment are generally linear, the present invention contemplates use of non-linear tubes such as the helical tube bundles, either having the same helical twist or a combination of left-hand and right-hand helical twists as disclosed in applicants' co-pending application Ser. No. 13/864,018, the specification of which is incorporated herein by reference. Use of helical tubes as a substitute configuration in the remanufacture OEM EGR coolers is, in particular, contemplated herein. Helical tubes, being less sensitive to thermal stress, may be welded to end plates 44, 44A before the tube assembly 40 is welded to housing 12 without concern for thermal stress. Welding the tube joints to the end plates while the tubes are exposed before tube assembly 40 is inside the housing 12 makes the welding easier to perform and inspect.

Once installed, the cooler will either replace an existing stock ECR cooler, or may also be used as an original equipment cooler with superior durability and heat exchange characteristics. The generous surface area of the plurality of tubes 20, 20A provide effective heat exchange and cooling of the gas passing through the tubes. The unobstructed passageways also are less subject to becoming restricted due to deposits which may occur during operation. FIGS. 5 and 6 are perspective views of other embodiments of the cooler according to the present invention. As mentioned, the EGR cooler may be variously configured depending on the stock model to be replaced. Accordingly, FIG. 5 shows an EGR cooler 11 0 having a cylindrical housing 112 and in other respects the same or similar to that described with reference to FIGS. 1 to 4. FIG. 6, again, shows an EGR cooler 2 10, the same or similar in construction to that shown in FIGS. 1 to 4, having a generally rectangular housing containing a plurality of heat exchange tubes 20. The EGR coolers of FIGS. 5 and 6 are designed for compatibility with engines such as exemplary 4.5 L diesel engines and may be shorter in length than units such as the unit shown in FIGS. 1 to 4 designed for larger displacement engines such as the exemplary 6.0 L Ford Power Stroke diesel.

Figure 7:
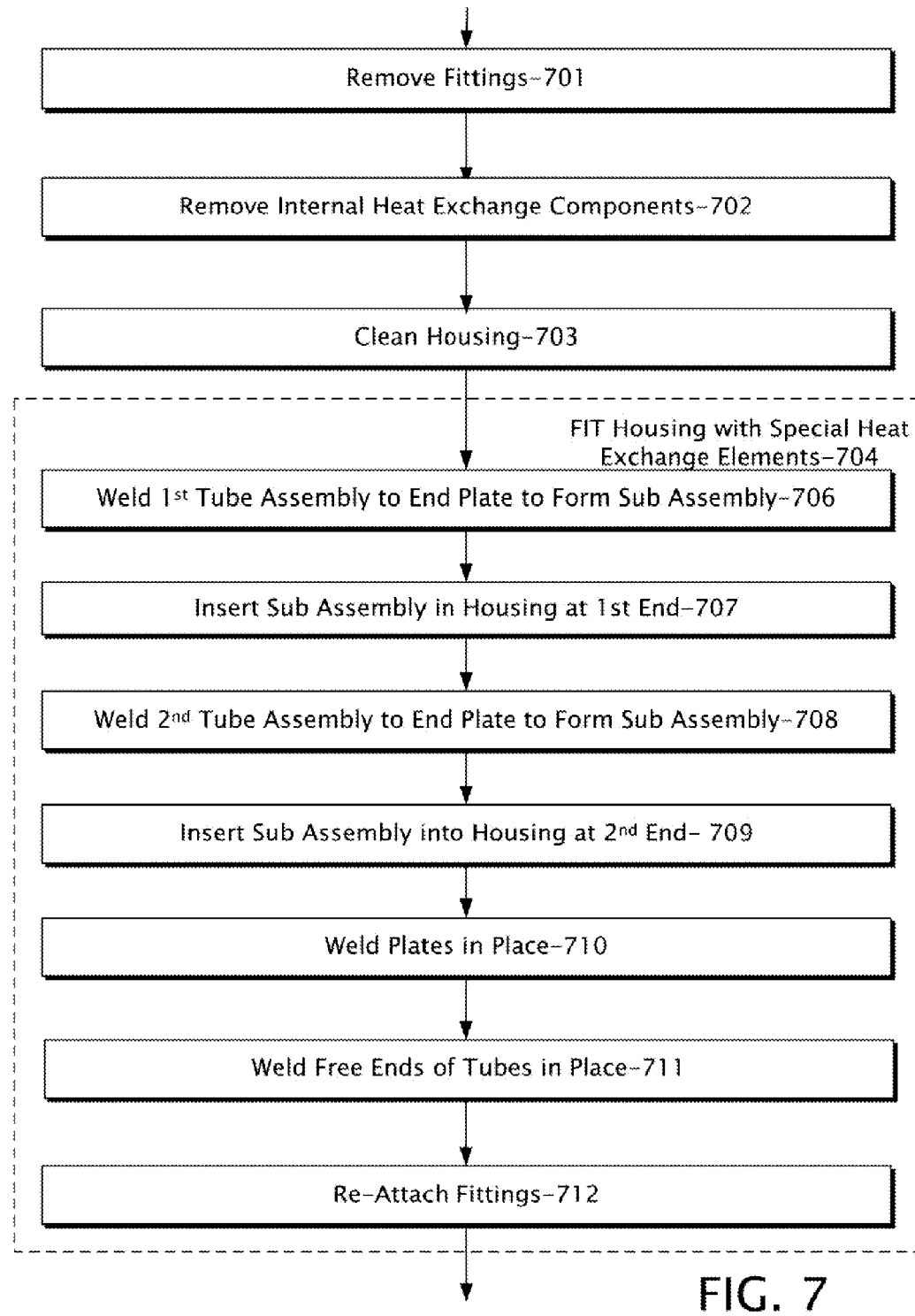
FIG. 7 shows a process flow diagram for fabricating the specially designed EGR cooler.

FIG. 7 shows a process flow diagram for fabricating the specially designed EGR cooler. The foregoing describes in detail the constructional features of the EGR cooler. These features can also be embodied in a cooler when rebuilding or refurbishing a salvaged EGR cooler that has experienced a failure. Rebuilding starts with an existing or stock EGR cooler, such as shown in FIGS. 1 to 4, which has been removed from an engine from which the housing (12 of FIG.

1) can be salvaged. In this way, the rebuilt EGR cooler will retain the same stock housing and stock exhaust and coolant fittings so the rebuilt cooler can easily be reinstalled on an engine from which the cooler has been removed with little or no modification to the engine.

The rebuilding begins by at block 701 initially removing the fittings (15, 16 of FIG. 1) on the opposite ends of the housing which connect to the exhaust system. The fittings are removed by cutting them from the ends of the tubular housing using a cut-off saw or other tool. At block 702 the existing internal heat exchange components, such as the stock parallel plate matrix is then removed, preferably by using a hydraulic press, arbor press or other tool to force them from the chamber (74 of FIG. 2) of the tubular housing (12 of FIG. 1). At block 703, once the existing internal components are removed, the housing is then cleaned either by using a cleaning solution or by placing the housing in a polishing tumbler with a polishing medium.

At block 704 the clean housing is then fitted with new internal heat exchange assembly (40 of FIG. 4) with tube sub-assemblies (50, 50A of FIG. 4) which in the illustrative embodiment comprise three tubes each. The process of block 704 may include a number of sub-processes. A first tube sub-assembly (50 of FIG. 4) is assembled by attaching three aligned tubes (20 of FIG. 4) to an end plate (44 of FIG. 4) at block 706. At block 707 the sub-assembly is inserted into the housing chamber (74 of FIG. 3) from one end of the housing using suitable tooling. At block 708 a second tube sub-assembly, is assembled by attaching three aligned tubes (20A of FIG. 4) to an end plate (44A of FIG. 4). At block 709 this assembly is inserted from the opposite housing end. The end plates (44, 44A of FIG. 4) each have pre-drilled holes to receive the free ends of the tubes of the sub-assembly inserted from the opposite housing end. At block 710 the plates (44, 44A of FIG. 4) are welded in place to the interior of the housing at opposite ends of the housing. The unwelded tube ends are also welded in place in process block 711. Any tube ends projecting from the end plates are cut off and the tube ends and end plates are ground and finished.

At block 712, the fittings (15, 16 of FIG. I), which are to be connected in the engine exhaust system, can now be welded to the ends of housing (12 of FIG. 1) completing the rebuilt EGR cooler which is ready for installation in an engine.

The larger tubes provide passageways for exhaust that will not easily become clogged or obstructed over a period of use and expansion and contraction is more uniform. The tube surfaces also provide a substantial area for effective heat exchange between the engine coolant and exhaust gas. Accordingly effective heat transfer may be accomplished without the need for fins, stacked plates, and other unreliable heat exchange components that are currently utilized.

The EGR cooler of the present invention, whether an OEM or rebuilt unit, provide a vital and effective component of the vehicle emission control system minimizing failures that result from flow restriction and inefficient heat exchange that occurs with many conventional EGR coolers.

Although certain illustrative embodiments and methods have been disclosed herein, it will be apparent from the foregoing disclosure to those skilled in the art that variations and modifications of such embodiments and methods may be made without departing from the invention. Accordingly, it is intended that the invention should be limited only to the extent required by the appended claims and the rules and principles of applicable law. Additionally, as used herein, references to direction such as "up" or "down" are intend to be exemplary and are not considered as limiting the invention and, unless otherwise specifically defined, the terms "generally," "substantially," or "approximately" when used with mathematical concepts or measurements mean within ±10 degrees of angle or within 10 percent of the measurement, whichever is greater, and as used herein, a step of "providing" a structural element recited in a method claim means and includes obtaining, fabricating, purchasing, acquiring or otherwise gaining access to the structural element for performing the steps of the method.

What is claimed is:

1. A method of refurbishing an exhaust gas recirculation (EGR) cooler, the EGR cooler having a housing with internal heat exchanger elements, an exhaust gas inlet fitting, an exhaust gas outlet fitting, a coolant inlet fitting and a coolant outlet fitting, the method comprising:
   (a) providing a salvaged EGR cooler;
   (b) cutting the exhaust gas inlet fitting and the exhaust gas outlet fitting from the housing;
   (c) removing the internal heat exchanger elements from the housing;
   (d) providing first and second tube sub-assemblies, the first and second tube sub-assemblies each comprising an end plate with a selected number of tubes rigidly attached thereto, each of the tubes having a fixed end and a free end, the end plate further comprising a selected number of bores;
   (e) fabricating a tube assembly by inserting the free ends of the tubes of the first tube sub-assembly into the bores of the second tube sub-assembly and inserting the free ends of the tubes of the second tube sub-assembly into the bores of the first tube sub-assembly;
   (f) fusing the free ends of the tubes of the first tube sub-assembly to the bores of the second tube sub-assembly and fusing the free ends of the tubes of the second tube sub-assembly to the bores of the first tube sub-assembly;
   (g) inserting the tube assembly into the housing;
   (h) fusing the end plates of the first and second tube sub-assemblies to the housing; and
   (i) fusing an inlet fitting and an outlet fitting to the housing, the inlet fitting and the housing cooperating to form an exhaust inlet chamber, the outlet fitting and the housing cooperating to form an exhaust outlet chamber, the exhaust inlet chamber being in fluid communication with the exhaust outlet chamber via the tubes of the first and second tube sub-assemblies.

2. The method of claim 1, wherein:
   each tube sub-assembly has an identical number of tubes.

3. The method of claim 1, wherein:
   the tubes of each tube sub-assembly are rigidly attached to the end plate by an interference fit.

4. The method of claim 1, wherein:
   the housing has a first end and a second, opposite end, wherein the tube assembly is fabricated by inserting the first tube sub-assembly into the first end of the housing and the second tube sub-assembly into the second end of the housing.

5. The method of claim 1, wherein:
   the step of fusing the free ends of the tubes is carried out before the step of inserting the tube assembly into the housing.

6. The method of claim 1, wherein:
   the step of fusing the free ends of the tubes is carried out after the step of inserting the tube assembly into the housing.

7. The method of claim 1, further comprising:
cleaning the housing by means of tumbling the housing in a tumbling media.

8. The method of claim 1, further comprising:
cleaning the housing using a cleaning solution.

9. The method of claim 1, wherein:
the step of removing the existing heat exchanger elements from within the housing is carried out using a hydraulic ram.

10. The method of claim 1, wherein:
the step of fusing an inlet fitting to the housing further comprises providing an inlet fitting salvaged from an EGR cooler.

11. The method of claim 1, wherein:
the step of fusing an outlet fitting to the housing further comprises providing an outlet fitting salvaged from an EGR cooler.

12. The method of claim 1, wherein:
the step of fusing the free ends of the tubes of the first tube sub-assembly to the bores of the second tube sub-assembly and fusing the free ends of the tubes of the second tube sub-assembly to the bores of the first tube sub-assembly is carried out by welding.

* * * * *